(12) United States Patent
Maury

(10) Patent No.: US 9,125,395 B1
(45) Date of Patent: Sep. 8, 2015

(54) APPARATUS AND METHOD FOR BIRD DETERRENCE FOR A MARINE VESSEL

(71) Applicant: Richard A. Maury, Titusville, FL (US)

(72) Inventor: Richard A. Maury, Titusville, FL (US)

(*) Notice: Subject to any disclaimer, the term of this patent is extended or adjusted under 35 U.S.C. 154(b) by 42 days.

(21) Appl. No.: 14/204,927

(22) Filed: Mar. 11, 2014

Related U.S. Application Data

(60) Provisional application No. 61/776,930, filed on Mar. 12, 2013.

(51) Int. Cl.
*A01M 29/00* (2011.01)
*A01M 29/32* (2011.01)
*B63B 17/00* (2006.01)

(52) U.S. Cl.
CPC .............. *A01M 29/32* (2013.01); *B63B 17/00* (2013.01)

(58) Field of Classification Search
CPC ....... A01M 29/32; A01M 29/26; B63B 17/00
USPC ................ 119/713; 114/361, 364; 52/101
See application file for complete search history.

(56) References Cited

U.S. PATENT DOCUMENTS

| | | | |
|---|---|---|---|
| 5,092,088 A * | 3/1992 | Way | 52/101 |
| 5,341,759 A | 8/1994 | Hood | |
| 5,476,062 A | 12/1995 | Ondris et al. | |
| 5,649,394 A * | 7/1997 | Ohba | 52/101 |
| 5,713,160 A * | 2/1998 | Heron | 52/101 |
| 5,845,607 A | 12/1998 | Kastner et al. | |
| 5,918,404 A * | 7/1999 | Ohba | 43/1 |
| 6,003,471 A * | 12/1999 | Ohba | 119/713 |
| 6,082,285 A | 7/2000 | Hinrichs | |
| 6,477,977 B1 * | 11/2002 | Combes | 114/343 |
| 6,863,012 B2 * | 3/2005 | Levin | 114/221 R |
| 6,918,214 B2 * | 7/2005 | Sabine | 52/101 |
| 6,941,886 B1 * | 9/2005 | Suelzer | 114/343 |
| 8,104,235 B2 | 1/2012 | McCulloch et al. | |
| 8,240,094 B1 | 8/2012 | Serschen | |
| 2006/0118060 A1 | 6/2006 | Ingraham et al. | |
| 2006/0283370 A1 | 12/2006 | Kurtzweil | |
| 2011/0011327 A1 | 1/2011 | DiSimone | |
| 2012/0180714 A1 | 7/2012 | Bir, Jr. | |

* cited by examiner

*Primary Examiner* — Yvonne Abbott-Lewis

(57) ABSTRACT

Apparatus and methods are disclosed for bird deterrence proximate to a marine vessel. The apparatus includes a first support structure and a second support structure. The apparatus includes a first support member configured for height adjustment and a second support member configured for width adjustment. The apparatus includes a plurality of attachment posts with at least one attachment post mounted on the first support structure and at least one attachment post mounted the second support structure, a plurality of wires with at least one wire connected to and extending between the attachment post mounted on the first support structure and the attachment post mounted the second support structure, and at least one resilient member connected to at least one of the wires.

43 Claims, 4 Drawing Sheets

APPARATUS AND METHOD FOR BIRD DETERRENCE FOR A MARINE VESSEL

CROSS-REFERENCE TO RELATED APPLICATIONS

This application claims the benefit of U.S. Provisional Application No. 61/776,930 filed Mar. 12, 2013 which is hereby incorporated herein by reference in its entirety, except that the present application supersedes any portion of the above referenced application which is inconsistent with the present application.

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISC APPENDIX

Not Applicable

FIELD OF THE INVENTION

The present invention relates to a bird deterrent apparatus which extends over a marine vessel to prevent birds from landing on the marine vessel. In particular, the present invention relates to a bird deterrent apparatus which uses wires which extend over the marine vessel when the marine vessel is docked to deter birds from landing on the marine vessel.

BACKGROUND OF THE INVENTION

The statements in this support section merely provide background information related to the present disclosure and may not constitute prior art.

Birds are known to perch and defecate on docked marine vessels. The droppings of these birds can cause damage to the marine vessel, creates an aesthetic nuisance, and can be a potential health hazard to boaters. In many cases, boaters must spend significant time cleaning up the mess caused by birds. Some boaters often find it necessary to repair damage that the droppings have caused to the marine vessel's finish. In response to these problems, numerous devices have been devised and utilized in an effort to deter birds from landing on boats. Among the known bird deterrent devices are imitation predators such as owls, snakes, and ravens; painted balloons; reflective streamers; small flags; and noise makers. Known bird deterrent devices are disadvantaged in that they are generally obtrusive and require considerable time to setup, and then disassemble or store before using the marine vessel. Some known bird deterrent devices are further disadvantaged by requiring a surface on the marine vessel for setup, and therefore requiring disassembly before using the marine vessel.

Therefore, there remains a need to provide an adjustable bird deterrent apparatus configured for setup external to a marine vessel.

BRIEF SUMMARY OF THE INVENTION

The present invention relates to an apparatus for deterring birds from landing on a marine vessel in a docking position. The apparatus includes a first support structure having a first support member and a second support member connected together, the first support member having a first end and a second end with a height between the ends, the height of the first support member being adjustable, the second support member having a first end and a second end with a width between the ends, the width of the second support member being adjustable, the first support member of the first support structure being configured to mount at the first end adjacent the docking position, a second support structure having a first support member and a second support member connected together, the first support member having a first end and a second end with a height between the ends, the height of the first support member being adjustable, the second support member having a first end and a second end with a width between the ends, the width of the second support member being adjustable, the first support member of the second support structure being configured to mount at the first end adjacent the docking position, a plurality of attachment posts with at least one attachment post mounted on the first support structure and at least one attachment post mounted the second support structure, a plurality of wires with at least one wire connected to and extending between the attachment post mounted on the first support structure and the attachment post mounted the second support structure, and at least one resilient member connected to at least one of the wires.

Further, the present invention relates to an apparatus for deterring birds from landing on a marine vessel in a docking position. The apparatus includes a first support structure having a first support member and a second support member connected together, the first support member having a first end and a second end with a height between the ends, the height of the first support member being adjustable, the second support member having a first end and a second end with a width between the ends, the width of the second support member being adjustable, the first support member of the first support structure being configured to mount at the first end on a surface adjacent the docking position, a second support structure having a first support member and a second support member connected together, the first support member having a first end and a second end with a height between the ends, the height of the first support member being adjustable, the second support member having a first end and a second end with a width between the ends, the width of the second support member being adjustable, the first support member of the second support structure being configured to mount at the first end on a surface adjacent the docking position, at least one attachment post mounted on the first support structure and at least one attachment post mounted the second support structure, a plurality of wires, each wire having opposed first and second ends with the first end and second end of each wire connected to the attachment posts, and at least one resilient member connected to each of the wires.

Still further, the present invention relates to a method for protecting a marine vessel in a docking position from birds. The method includes providing a first support structure having a first support member and a second support member connected together, the first support member having a first end and a second end with a height between the ends, the height of the first support member being adjustable, the second support member having a first end and a second end with a width between the ends, the width of the second support member being adjustable; a second support structure having a first support member and a second support member connected together, the first support member having a first end and a second end with a height between the ends, the height of the first support member being adjustable, the second support member having a first end and a second end with a width between the ends, the width of the second support member being adjustable; attachment posts with at least one attachment post mounted on the first support structure and at least one attachment post mounted the second support structure; a plurality of wires with at least one wire connected to and extending between the attachment post mounted on the first support structure and the attachment post mounted the second support structure; and at least one resilient member connected to the wires, adjusting the width of the second support member of the first support structure, adjusting the width of the second support member of the second support structure, mounting the first end of the first support member of the first support structure adjacent the docking position, and mounting the first end of the second support member of the second support structure adjacent the docking position spaced apart from the first support structure.

Further still, the present invention relates to a method for protecting a marine vessel in a docking position from birds. The method includes providing a first support structure having a first support member and a second support member connected together, the first support member having a first end and a second end with a height between the ends, the height of the first support member being adjustable, the second support member having a first end and a second end with a width between the ends, the width of the second support member being adjustable; a second support structure having a first support member and a second support member connected together, the first support member having a first end and a second end with a height between the ends, the height of the first support member being adjustable, the second support member having a first end and a second end with a width between the ends, the width of the second support member being adjustable; attachment posts with at least one attachment post mounted on the first support structure and at least one attachment post mounted the second support structure; a plurality of wires with at least one wire connected to and extending between the attachment post mounted on the first support structure and the attachment post mounted the second support structure; and at least one resilient member connected to each of the wires, adjusting the width of the second support member of the first support structure by moving the second end of the second support member outward in a direction opposite the first end of the second support member, adjusting the width of the second end of the second support member of the second support structure by moving the second end of the second support member outward in a direction opposite the first end of the second support member, mounting the first support structure adjacent the docking position, mounting the second support structure adjacent the docking position spaced apart from the first support structure, adjusting the height of the first and second support members of the first and second support structures so that a plane formed by the plurality of wires is spaced apart from the docking position at least a distance greater than a height of the marine vessel, moving the marine vessel into the docking position, unloading the marine vessel, and adjusting the height of the first and second support members so that the distance between the plane formed by the plurality of wires and the docking position is reduced.

The substance and advantages of the present invention will become increasingly apparent by reference to the following drawings and the description. This summary is provided merely to introduce certain concepts and not to identify key or essential features of the claimed subject matter.

BRIEF DESCRIPTION OF THE SEVERAL VIEWS OF THE DRAWINGS

One or more embodiments will now be described, by way of example, with reference to the accompanying drawings, in which.

DETAILED DESCRIPTION OF THE INVENTION

Figure 1:
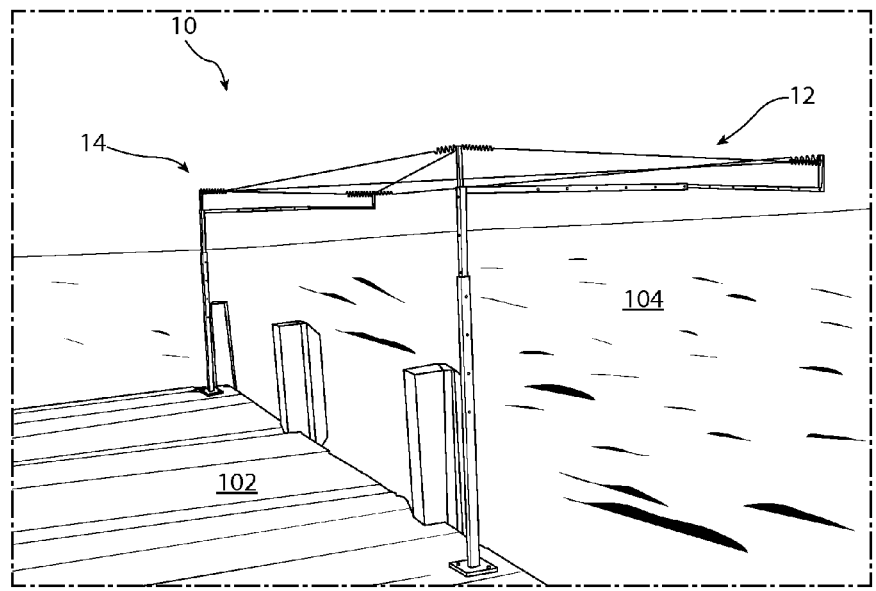
FIG. 1 is a perspective view of the bird deterrent apparatus 10 mounted on a dock 102, in accordance with the present disclosure.
Figure 2:
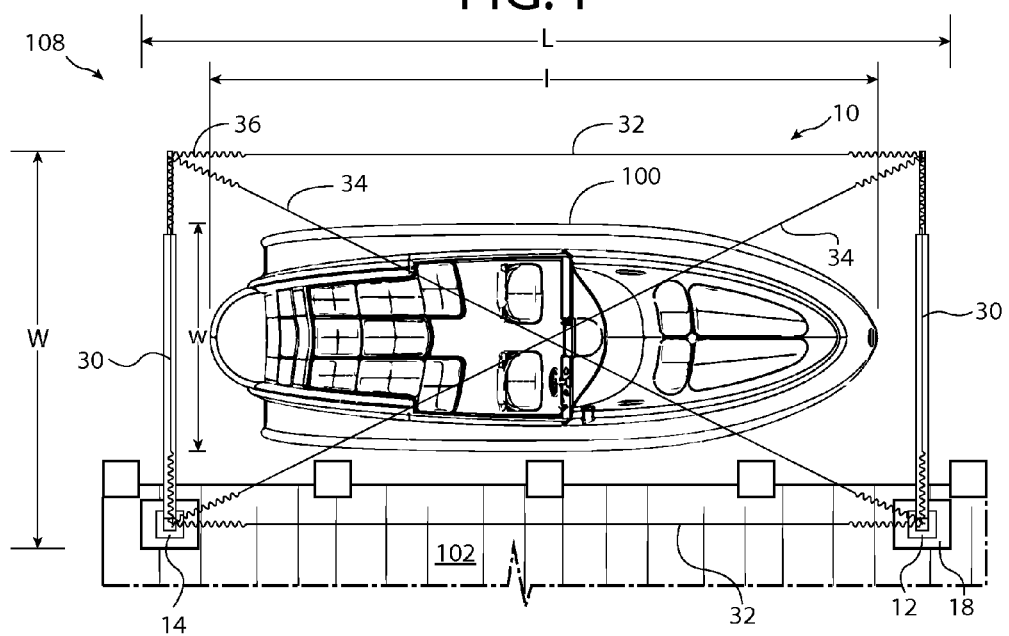
FIG. 2 is a top view of the bird deterrent apparatus 10 mounted on a dock 102 and extending over a marine vessel 100, in accordance with the present disclosure.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Referring now to the drawings, wherein the depictions are for the purpose of illustrating certain exemplary embodiments only and not for the purpose of limiting the same, FIG. 1 shows a bird deterrent apparatus 10. The bird deterrent apparatus 10 is configured for use on a surface 102 adjacent to a water body 104. The bird deterrent apparatus 10 is configured for use proximate to a docking position 108 having a width ('W') and a length ('L') over a marine vessel 100 having a width ('w') and length ('l'). The bird deterrent apparatus 10 of the present disclosure includes first and second support structures 12 and 14, having attachment posts 22 and 24 and a plurality of bird deterrent wires 30, 32 and 34. The support structures 12 and 14 are mountable on the surface 102 adjacent to a marine vessel 100 and provide support for the bird deterrent wires 30, 32 and 34. The bird deterrent apparatus 10 uses the plurality of the bird deterrent wires 30, 32, and 34 which extend over the marine vessel 100 to keep birds away from the marine vessel 100, reducing the risk of the birds defecating on the marine vessel 100. In one embodiment, the first support member 16 and the second support member 20 of the support structures 12 and 14 are constructed of a lightweight, durable, weather resistant material. In one embodiment, the support structures 12 and 14 are constructed of aluminum. In one embodiment, the support structures 12 and 14 are essentially identical so only the first support structure 12 will be described in detail.

The first support structure 12 includes a first support member 16 having opposed first and second ends 16A and 16B. The first end 16A of the first support member 16 is mounted on the surface 102. In one embodiment, the first end 16A is removably mounted on the surface 102. In one embodiment, the first support member 16 is mounted by a base 18 to the surface 102. In one embodiment, the first support member 16 and the base 18 are a single integral component. In one embodiment, the first support member 16 extends upward from the surface 102 in an essentially vertical direction, perpendicular to the surface 102. The height of the first support member 16 between the ends 16A and 16B is adjustable such that a distance between the surface 102 and the second end 16B of the first support member 16 can be varied. In one embodiment, the first support structure 12, the first support member 16 and the base 18 form a vertical telescoping arm. In one embodiment, the first support member 16 includes a plurality of telescoping support sections. In one embodiment, the first support member 16 includes a support section 17 and a support section 19 telescopingly mounted together. In one embodiment, the support section 19 is slidably mounted into the support section 17. The support section 19 extends out of the end of the support section 17 and forms the second end 16B of the first support member 16. In one embodiment, the first and second support sections 17 and 19 of the first support member 16 have a square cross-sectional shape such that the support section 19 cannot rotate in the support section 17. In one embodiment, the first and second support sections 17 and 19 of the first support member 16 have a circular cross-sectional shape. It is to be understood that the first and second support sections 17 and 19 can be longer or shorter with respect to one another depending on the height "h" of the marine vessel 100 when in the docking position 108, weight of the wires 30, 32, and 34, and material formed of the support sections 17 and 19.

A second support member 20 extends outward from the second end 16B of the first support member 16. In the illustrated embodiment, the second support member 20 includes a first support section 21 and a moveable support section 23. The second support member 20 has opposed first and second ends 20A and 20B, which define the length of the second support member 20. The length of the second support member 20 between the ends 20A and 20B is adjustable. In one (1) embodiment, a first edge surface 20C and a second edge surface 20D extend between the ends 20A and 20B of the second support member 20. In one embodiment, the first end 22A is attached to the second end 16B of the first support member 16. In one embodiment, the second support member 20 extends outward from the first support member 16 in a direction essentially perpendicular to the first support member 16 and essentially parallel to the surface 102. In one embodiment, the second end 16B of the first support member 16 and the first end 20A of the second support member 20 form an essentially 90 degree angle. In one embodiment, the second support member 20 is adjustable between the ends 20A and 20B. In one embodiment, the second support member 20 is formed of a plurality of telescoping support sections, together forming a horizontal telescoping arm. In one embodiment, the first support section 21 and the support section 23 are telescopingly connected together. In one embodiment, the support section 23 is slidably mounted in the support section 21. The support section 23 extends out of the end of the support section 21 and forms the second end 20B of the second support member 20. In one embodiment, the support sections 21 and 23 of the second support member 20 have a square cross-sectional shape. In one embodiment, the support sections 21 and 23 of the second support member 20 have a circular cross-sectional shape. It is to be understood that the support sections 21 and 23 can be longer or shorter with respect to one another depending on the intended height of the marine vessel 100, material formed of the support sections 17 and 19, and whether the apparatus 10 is configured to be left mounted on the surface 102.

Figure 3:
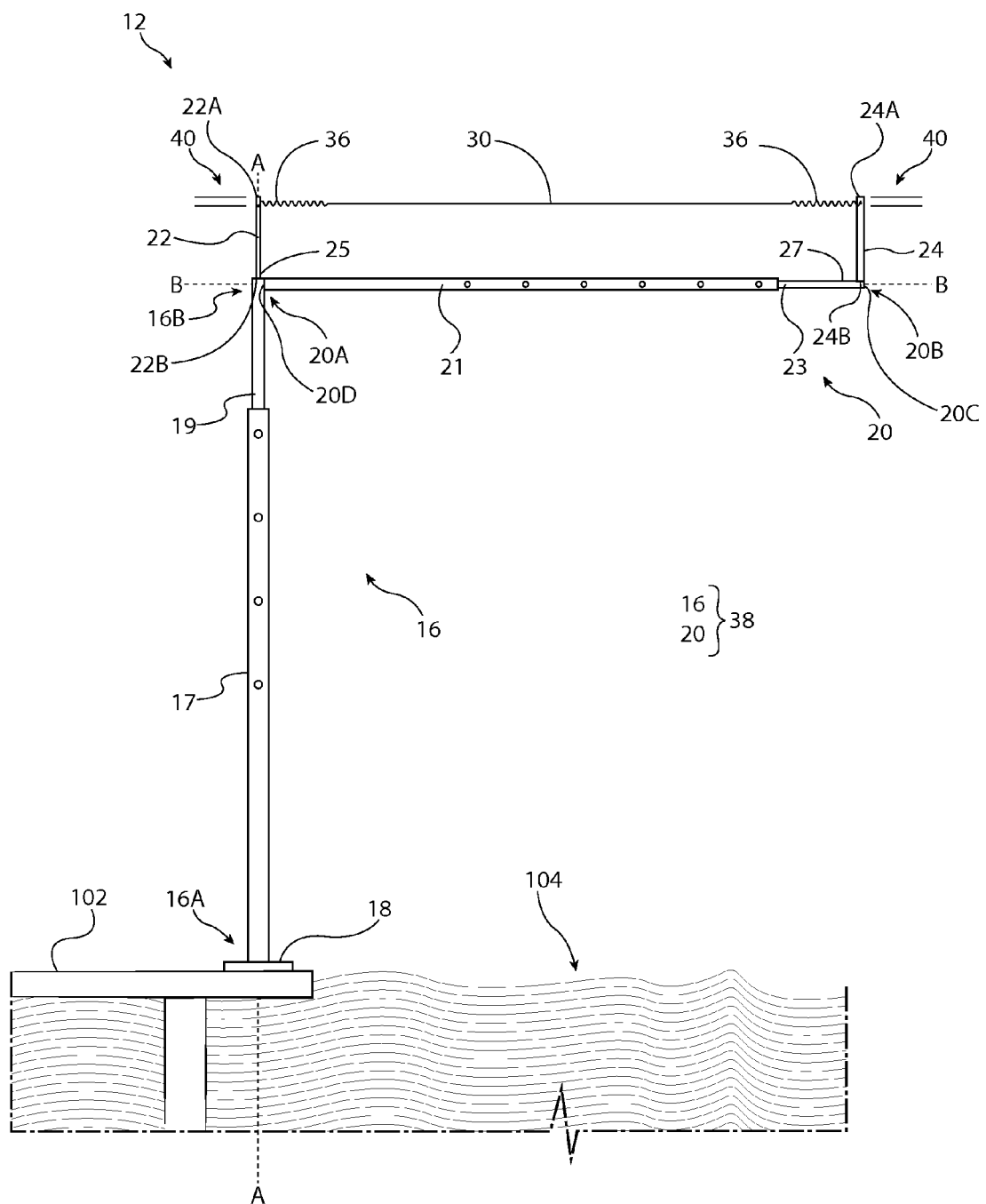
FIG. 3 is a side view of one of the support structures 12 of the bird deterrent apparatus 10 showing the first support member 16, the second support member 20 and the first deterrent wire 30, in accordance with the present disclosure.

As FIG. 3 shows, the support section 17 configured to adjustably mount to the base 18 or the support section 19 along a vertical axis A-A of the first support member 16 relative to the base 18. One or more support sections 23 may be configured to adjustably mount to the support section 21 along a horizontal axis B-B of the second support member 20. In one embodiment, the support section 19 and the support section 21 are formed of a single, integral L-shaped component.

The attachment posts 22 and 24 have opposed first and second ends 22A, 24A and 22B, 24B, respectively. In one embodiment, a first attachment post 22 is mounted on the second end 16B of the first support member 16 on a top edge surface 25. In one embodiment, where the first support member 16 and support section 21 are integrated, the first attachment post 22 is mounted on the top edge surface 25. In one embodiment, the first attachment post 22 is mounted perpendicular to the second support member 20. In one embodiment, the first attachment post 22 is mounted on the first end 20A of the second support member 20 adjacent the second end 16B of the first support member 16. In one embodiment, the first attachment post 22 is mounted at the first end 22A to the first support member 16 and extends upward from the edge surface 25 in a direction essentially opposite the first edge surface 20D of the second support member 20. The first attachment post 22 extends upward from the second end 16B of the first support member 16 in a direction essentially opposite the surface 102. In one embodiment, the first attachment post 22 is aligned with axis A-A of the first support member 16. In one embodiment, the first attachment post 22 is parallel to the axis A-A of the first support member 16.

A second attachment post 24 is mounted on the second support member 20 opposite the first support member 16. In one embodiment, the second attachment post 24 is mounted on the second end 20B of the second support member 20 opposite the first support member 16. In one embodiment, the second attachment post 24 is mounted at the first end 24A to the second edge surface 20C of the second support member 20 and extends upward from the second edge surface 20C in a direction essentially opposite the first edge surface 20C. The second attachment post 24 extends upward from the second support member 20 in a direction essentially opposite the surface 102. The second attachment post 24 extends upward essentially perpendicular to the second support member 20 in a direction away from the surface 102. In one embodiment, the first attachment post 22 and the second attachment post 24 are spaced apart and are essentially parallel. In one embodiment, the attachment posts 22 and 24 have essentially the same height. In one embodiment, the second attachment post is mounted on the edge surface 27 associated with the support section 23.

The bird deterrent wires 30, 32 and 34 extend between the attachment posts 22 and 24 of the support structures 12 and 14. The bird deterrent wires 30, 32 and 34 have opposed ends. In one embodiment, the bird deterrent wires 30, 32 and 34 are removably attached to the attachment posts 22 and 24. In one embodiment, both ends of the bird deterrent wires 30, 32 and 34 are attached to the attachment posts 22 and 24 by a resilient member 36 so that the deterrent wires 30, 32 and 34 can move and flex between the attachment posts 22 and 24. In one embodiment, only one (1) end of each bird deterrent wire 30, 32 or 34 is attached to the attachment posts 22 or 24 by a resilient member 36. In one embodiment, the resilient member 36 is a spring. In one embodiment, the resilient member 36 is a coil spring. However, it is understood that any type of resilient member 36 can be used. In one embodiment, the bird deterrent wires 30, 32 and 34 are constructed of a resilient material such that the resilient members 36 are not used and the ends of the bird deterrent wires 30, 32 and 34 are attached directly to the attachment posts 22 and 24. In one embodiment, the bird deterrent wires 30, 32 and 34 and resilient members 36 are integrally formed. In one embodiment, the bird deterrent wires 30, 32 and 34 are each coiled at both ends, forming resilient members 36 at each end of the deterrent wires 30, 32 and 34. In one embodiment, the resilient members 36 allow for movement of the bird deterrent wires 30, 32 and 34 such as to enable adjustment of the width and length of the bird deterrent apparatus 10. Further, the resilient members 36 help to prevent damage to the bird deterrent wires 30, 32 and 34 and the bird deterrent apparatus 10 if an object contacts the bird deterrent wires 30, 32 or 34, by allowing the bird deterrent wires 30, 32 and 34 to move and flex.

A pair of first bird deterrent wires 30 extend between the first attachment post 22 and the second attachment post 24 of the same support structure 12 or 14. A pair of second bird deterrent wires 32 extend between the first attachment post 22 of the first support structure 12 and the first attachment post 22 of the second support structure 14 and between the second attachment post 24 of the first support structure 12 and the second attachment post 24 of the second support structure 14. In one embodiment, the first bird deterrent wires 30 and the second bird deterrent wires form an essentially rectangular shape. A pair of third bird deterrent wires 34 extend between the first attachment post 22 of the first support structure 12 and the second attachment post 24 of the second support structure 14 and between the first attachment post 22 of the second support structure 14 and the second attachment post 24 of the first support structure 12. The third deterrent wires 34 form an cross-shape or an X-shape within the rectangle formed by the first and second bird deterrent wires 30 and 32. In one embodiment, the X-shape is formed by intersecting wires 34 within an area bordered by wires 30 and 32. In one embodiment, the bird deterrent wires 30, 32 and 34 are attached to the attachment posts 22 and 24 such that the bird deterrent wires 30, 32 and 34 extend essentially parallel to the surface 102. In one embodiment, the bird deterrent wires 30, 32 and 34 form a plane 40 which is essentially parallel to the plane 40 formed by surface 102. In one embodiment, the bird deterrent wires 30, 32 and 34 are all mounted at the same height such that the bird deterrent wires 30, 32 and 34 are all in the same plane 40 and are spaced the same distance from the surface 102. In one embodiment, the bird deterrent wires 30, 32 and 34 are constructed of a weather resistant metal. However, it is understood that any durable material can be used to construct the bird deterrent wires 30, 32 and 34. In one embodiment, the bird deterrent wires 30, 32 and 34 are formed of steel.

In use, the support structures 12 and 14 are mounted on a surface 102 adjacent the marine vessel 100. In one embodiment, the surface 102 is a dock and the marine vessel 100 is moored adjacent the dock. In another embodiment, the surface 102 is the frame of a boat hoist (not shown) or marine vessel hoist on which the marine vessel 100 is supported. The first and second support structures 12 and 14 are mounted on the surface 102 in a spaced apart relationship. In one embodiment, the support structures 12 and 14 extend upward from the surface 102 in an essentially parallel, spaced apart relationship. In one embodiment, the first support structure 12 is positioned on the surface 102 adjacent the front end or bow of the marine vessel 100 and the second support structure 14 is positioned on the surface 102 adjacent the back end or stern of the marine vessel 100. In one embodiment, the distance between the support structures 12 and 14 is slightly greater than a length "L" of the marine vessel 100. In this embodiment, the first and second support structures 12 and 14 are mounted such that the second support member 20 of the support structures 12 and 14 extend outward along or adjacent to the front end or back end of the marine vessel 100, respectively. In one embodiment, where the surface 102 is a dock 102 and the marine vessel 100 is moored adjacent the dock and the docking position 108 is the water 104 adjacent the dock and the first and second supports structures 12 and 14 are mounted so that the second support member 20 extends outward over the water 104 adjacent the dock. It is understood that the first and second support structures 12 and 14 can be positioned adjacent the right and left sides of the marine vessel 100 with the second support members 20 of the support structures 12 and 14 extending outward along or adjacent to the left and right side of the marine vessel 100, respectively. The height of the first support member 16 of the support structures 12 and 14 is selected so that the bird deterrent wires 30, 32 and 34 are spaced above the top of the marine vessel 100. The length of the second support members 20 of the support structures 12 and 14 between the ends 20A and 20B is selected so that the second end 20B of the second support member 20 is spaced beyond a side of the marine vessel 100 opposite the surface 102.

When installed and in use, the height and width of the support structures 12 and 14 are selected such that the bird deterrent wires 30, 32 and 34 completely extend across the height "h", and width "w" of the marine vessel 100 in the docking position 108. The support structures 12 and 14 are mounted on the surface 102 in a spaced apart relationship to extend completely along the length "l" of the marine vessel 100 in the docking position 108. The bird deterrent wires 30, 32 and 34 extend along the sides and front end and back end of the marine vessel 100 and form a cross-shape essentially over a top and center of the marine vessel 100. The bird deterrent wires 30, 32 and 34 deter birds from landing on the marine vessel 100. The resilient members 36 used to attach the bird deterrent wires 30, 32, and 34 to the attachment posts 22 and 24 allow for varying the size of the bird deterrent wire apparatus 10 by varying the height of the support structures 12 and 14 and the length of the second support members 20 of the support structures 12 and 14.

By using resilient members 36 on one or both ends of the bird deterrent wires 30, 32, and 34, the tension of each wire 30, 32 and 34 can be individually adjusted. The user of resilient members 36 in the wires 30, 32 and 34 allows for the user of thinner material for the wires 30, 32 and 34 which allows for easier replacement of a wire 30, 32 and 34 in the case of breakage. The bird deterrent wires 30, 32 and 34 provide an obstacle on all four (4) sides of the marine vessel 100 as well as across the center or top of the marine vessel 100.

Figure 4:
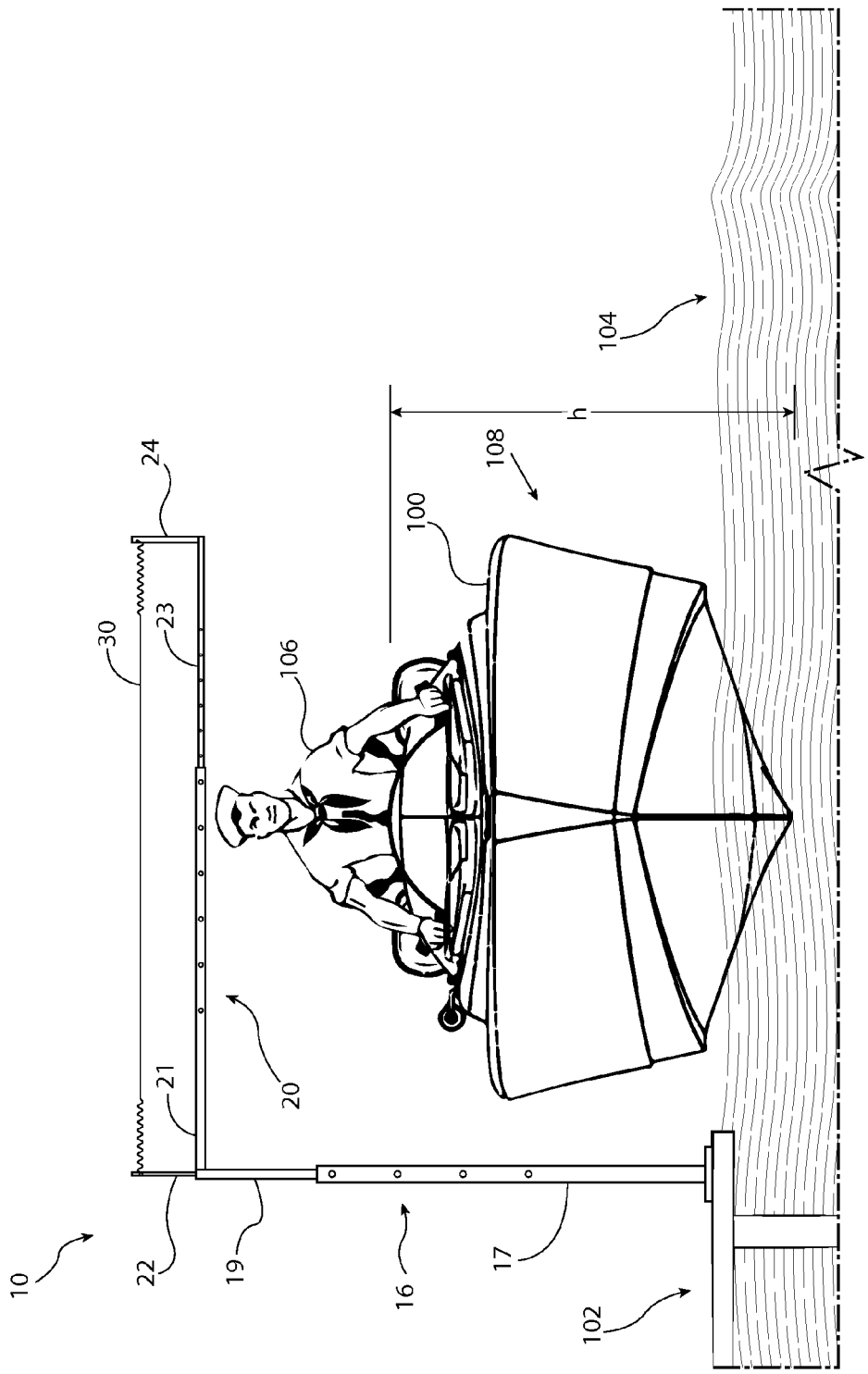
FIG. 4 is a side view of the bird deterrent apparatus 10 in an extended position with a marine vessel 100 and a boater 106 comfortably under the wires 30, 32 and 34, in accordance with the present disclosure.

FIG. 4 is a side view of the bird deterrent apparatus 10 depicting the first support member 16 in an extended position with the marine vessel 100 and a boater 106 comfortably under the wires. As FIG. 4 shows, the marine vessel 100 is able to dock in the docking position 108 under the support members 20 of the support structures 12 and 14 and wires 30, 32, and 34, providing a comfortable clearance to the boater 106 when docking or otherwise entering and exiting the marine vessel 100.

Figure 5:
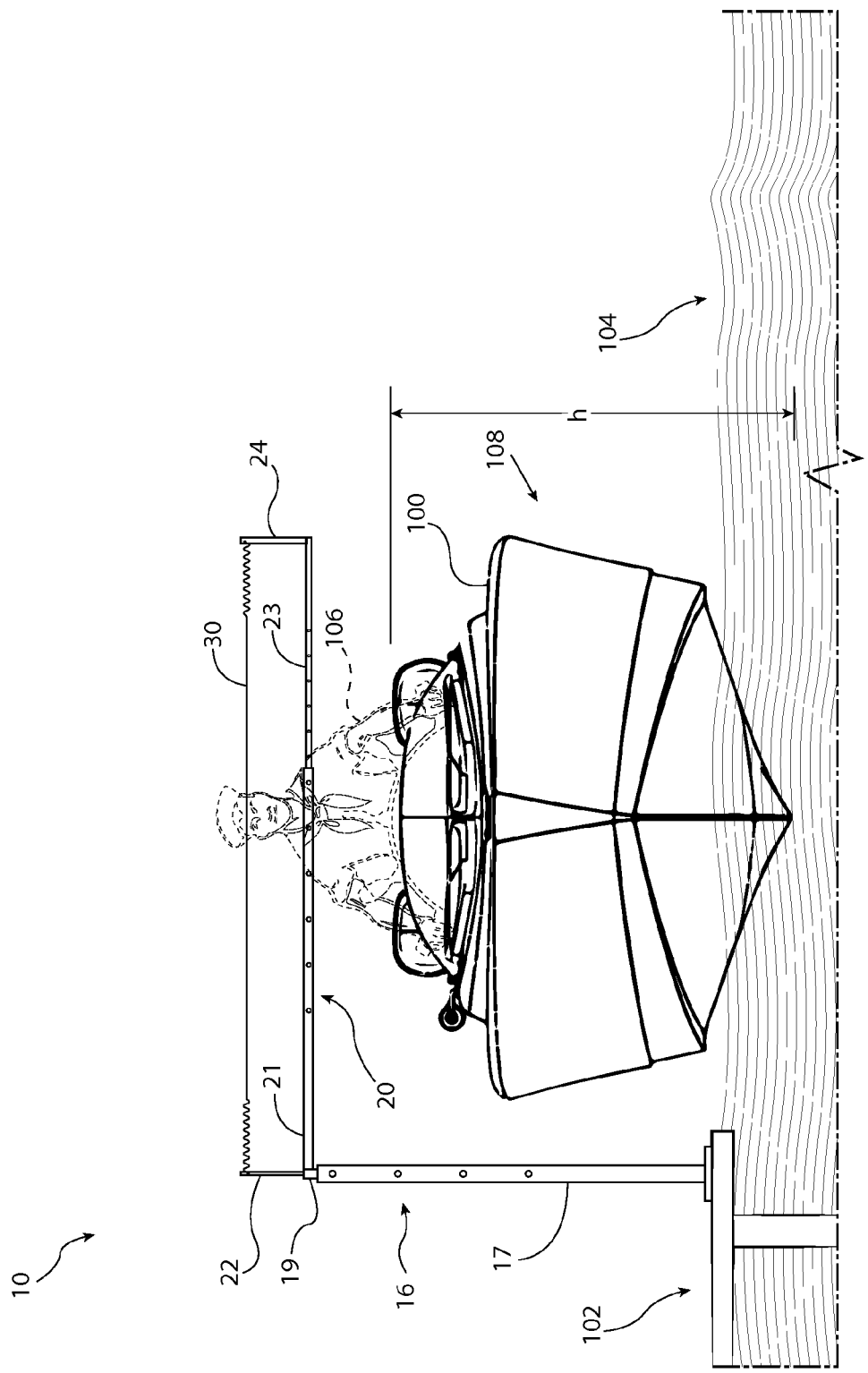
FIG. 5 is a side view of the bird deterrent apparatus 10 in a retracted position just above the marine vessel 100, with the boater 106 in the phantom lines, in accordance with the present disclosure.

FIG. 5 is a side view of the bird deterrent apparatus 10 showing the first support member 16 in a retracted position just above the marine vessel 100 with the boater 106, in phantom. As FIG. 5 shows, once the marine vessel 100 is docked, the boater 106 may lower one or both of the support structures 12 and 14 to position the wires 30, 32, and 34 just above the marine vessel 100. In this way, the wires 30, 32, and 34 are an effective deterrent to birds seeking to land or otherwise locate to the marine vessel 100. In one embodiment, the wires 30, 32, and 34 are loose and configured to resist or deter a landing bird without causing injury to the bird.

In the foregoing description, various features of the present invention are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated by reference herein in their entirety, with each claim standing on its own as a separate embodiment of the present invention.

It is intended that the foregoing description be only illustrative of the present invention and that the present invention be limited only by the hereinafter appended claims.

The invention claimed is:

1. An apparatus for deterring birds from landing on a marine vessel in a docking position, comprising:
   a. a first support structure having a first support member and a second support member connected together, the first support member having a first end and a second end with a height between the ends, the height of the first support member being adjustable, the second support member having a first end and a second end with a width between the ends, the width of the second support member being adjustable, the first support member of the first support structure being configured to mount at the first end adjacent the docking position;
   b. a second support structure having a first support member and a second support member connected together, the first support member having a first end and a second end with a height between the ends, the height of the first support member being adjustable, the second support member having a first end and a second end with a width between the ends, the width of the second support member being adjustable, the first support member of the second support structure being configured to mount at the first end adjacent the docking position;
   c. a plurality of attachment posts with at least one attachment post mounted on the first support structure and at least one attachment post mounted the second support structure;
   d. a plurality of wires with at least one wire connected to and extending between the attachment post mounted on the first support structure and the attachment post mounted the second support structure; and
   e. at least one resilient member connected to at least one of the wires.

2. The apparatus of claim 1 wherein the first ends of the second support members of the first and second support structures are connected to the second ends of the first support members of the first and second support structures and the second support members extend outward from the first support members towards the second ends of the second support members.

3. The apparatus of claim 1 wherein the second support members extend outward from the first support members towards the second ends of the second support members in a direction essentially perpendicular to the first support members.

4. The apparatus of claim 1 wherein the attachment posts are mounted on the second end of the first support members and on the second end of the second support members of the first and second support structures.

5. The apparatus of claim 1 wherein the second support members have a first edge surface and an opposed second edge surface extending between the ends and the attachment posts have opposed ends with one end mounted on the second edge surface of the second support members and wherein the attachment posts extend outward from the second edge surface of the second support members in a direction opposite the first edge surface.

6. The apparatus of claim 1 wherein axes of the first support members of the first and second support structures extend between the first and second ends of the first support members, wherein at least one attachment post is mounted on the first support member of the first support structure essentially aligned with the axis of the first support member of the first support structure and wherein at least one attachment post is mounted on the first support member of the second support structure essentially aligned with the axis of the first support member of the second support structure.

7. The apparatus of claim 6 wherein axes of the second support members of the first and second support structures extend between the first and second ends of the second support members, wherein at least one attachment post is mounted on the second support member of the first support structure essentially perpendicular to the axis of the second support member of the first support structure and wherein at least one attachment post is mounted on the second support member of the second support structure essentially perpendicular to the axis of the second support member of the second support structure.

8. The apparatus of claim 1 wherein axes of the first support members of the first and second support structures extend between the first and second ends of the first support members, wherein at least one attachment post is mounted on the first support member of the first support structure essentially parallel to the axis of the first support member of the first support structure and wherein at least one attachment post is mounted on the first support member of the second support structure essentially parallel to the axis of the first support member of the second support structure.

9. The apparatus of claim 1 wherein each of the wire is connected to at least one of the resilient members.

10. The apparatus of claim 9 wherein each wire has opposed ends and the resilient members are connected to each end of each wire.

11. The apparatus of claim 1 wherein the resilient members are connected to the attachment posts.

12. The apparatus of claim 1 wherein the resilient members are integral with the wires.

13. The apparatus of claim 1 wherein the resilient members are coil springs.

14. The apparatus of claim 1 wherein more than one wire is connected to each of the attachment posts.

15. The apparatus of claim 1 wherein the wires are constructed of a resilient material.

16. The apparatus of claim 1 wherein each of the plurality of wires is a separate wire.

17. The apparatus of claim 1 wherein there are six wires and four attachment posts and three wires are attached to each attachment post.

18. The apparatus of claim 1 wherein the wires extend between the attachment posts so that the wires form an X-shape extending between the attachment posts and a square extending between the attachment posts and surrounding the X-shaped wires.

19. The apparatus of claim 1 wherein the wires form a plane.

20. The apparatus of claim 19 wherein the plane is essentially parallel to the docking position.

21. The apparatus of claim 1, wherein the second support member of the first support structure comprises a plurality of telescoping sections.

22. The apparatus of claim 1, wherein the first support member and the second support member of the first and second support structures are integrally connected forming an L-shaped section.

23. An apparatus for deterring birds from landing on a marine vessel in a docking position, comprising:
   a. a first support structure having a first support member and a second support member connected together, the first support member having a first end and a second end with a height between the ends, the height of the first support member being adjustable, the second support member having a first end and a second end with a width between the ends, the width of the second support member being adjustable, the first support member of the first support structure being configured to mount at the first end adjacent the docking position;
   b. a second support structure having a first support member and a second support member connected together, the first support member having a first end and a second end with a height between the ends, the height of the first support member being adjustable, the second support member having a first end and a second end with a width between the ends, the width of the second support member being adjustable, the first support member of the second support structure being configured to mount at the first end adjacent the docking position;
   c. attachment posts with at least one attachment post mounted on the first support structure and at least one attachment post mounted the second support structure;
   d. a plurality of wires, each wire having opposed first and second ends with the first end and second end of each wire connected to the attachment posts; and
   e. at least one resilient member connected to each of the wires.

24. The apparatus of claim 23 wherein the first ends of the second support members of the first and second support structures are connected to the second ends of the first support members of the first and second support structures and the second support members extend outward from the first support members towards the second ends of the second support members and the attachment posts are mounted on the second ends of the first support members and on the second ends of the second support members of the first and second support structures.

25. The apparatus of claim 23 wherein the second support members of the first and second support structures have a first edge surface and an opposed second edge surface extending between the ends, and the attachment posts have opposed ends with one end mounted on the second edge surface of the second support members and wherein the attachment posts extend outward from the second edge surface of the second support members in a direction opposite the first edge surface.

26. The apparatus of claim 23 wherein the second support members extend outward from the first support members towards the second ends of the second support members in a direction essentially perpendicular to the first support members.

27. The apparatus of claim 23 wherein the resilient members are connected to the attachment posts and to each end of each wire.

28. The apparatus of claim 23 wherein there are six wires and four attachment posts and three wires are attached to each attachment post and the wires extend between the attachment posts so that the wires form an X-shape surrounded by a rectangle.

29. The apparatus of claim 23 wherein the wires extending between the attachment posts form a plane essentially parallel to the docking position.

30. The apparatus of claim 23 wherein axes of the first support members of the first and second support structures extend between the first and second ends of the first support members, wherein at least one attachment post is mounted on the first support member of the first support structure essentially aligned with the axis of the first support member of the first support structure, wherein at least one attachment post is mounted on the first support member of the second support structure essentially aligned with the axis of the first support member of the second support structure, wherein at least one attachment post is mounted on the second support member of the first support structure essentially parallel to the axis of the first support member of the first support structure and wherein at least one attachment post is mounted on the second support member of the second support structure essentially parallel to the axis of the first support member of the second support structure.

31. A method for protecting a marine vessel in a docking position from birds, comprising the step of:
   a. providing a first support structure having a first support member and a second support member connected together, the first support member having a first end and a second end with a height between the ends, the height of the first support member being adjustable, the second support member having a first end and a second end with a width between the ends, the width of the second support member being adjustable; a second support structure having a first support member and a second support member connected together, the first support member having a first end and a second end with a height between the ends, the height of the first support member being adjustable, the second support member having a first end and a second end with a width between the ends, the width of the second support member being adjustable; attachment posts with at least one attachment post mounted on the first support structure and at least one attachment post mounted the second support structure; a plurality of wires with at least one wire connected to and extending between the attachment post mounted on the first support structure and the attachment post mounted the second support structure; and at least one resilient member connected to the wires;
   b. adjusting the width of the second support member of the first support structure;
   c. adjusting the width of the second support member of the second support structure;
   d. mounting the first end of the first support member of the first support structure adjacent the docking position; and
   e. mounting the first end of the second support member of the second support structure adjacent the docking position spaced apart from the first support structure.

32. The method of claim 31 wherein a width of the docking position is essentially equal to a width of the marine vessel between sides of the marine vessel, and wherein further in step b), adjusting the width of the second support member of the first support structure a distance essentially equal to the width of the marine vessel.

33. The method of claim 31 wherein a width of the docking position is essentially equal to a width of the marine vessel between sides of the marine vessel, and wherein further in step c), adjusting the width of the second support member of the second support structure a distance essentially equal to the width of the marine vessel.

34. The method of claim 31 wherein a length of the docking position is essentially equal to a length of the marine vessel between a bow of the marine vessel and the stern of the marine vessel, and wherein further in step e), mounting the second support structure spaced apart from the first support structure a distance essentially equal to the length of the marine vessel.

35. The method of claim 31 wherein further mounting the first and second support structures simultaneously.

36. The method of claim 31 wherein further in step b), adjusting the height of the first support structure and wherein further in step c), adjusting the height of the second support structure so that a plane formed by the wires is greater than a height of the marine vessel in the docking position.

37. The method of claim 36 wherein further adjusting the height of the first support structure and the height of the second support structure so that the height of the first support structure and the height of the second support structure are essentially equal.

38. The method of claim 31 wherein further in step c), adjusting the width of the second support member of the second support structure a distance essentially equal to the width of the first support member of the first support structure.

39. The method of claim 31 wherein a width of the docking position is essentially equal to a width of the marine vessel between sides of the marine vessel and wherein further in step b), adjusting the width of the first and second support members of the first and second support structures so that a width of a plane formed by the wires is greater than the width of the docking position.

40. A method for protecting a marine vessel in a docking position from birds, comprising the steps of:
   a. providing a first support structure having a first support member and a second support member connected together, the first support member having a first end and a second end with a height between the ends, the height of the first support member being adjustable, the second support member having a first end and a second end with a width between the ends, the width of the second support member being adjustable; a second support structure having a first support member and a second support member connected together, the first support member having a first end and a second end with a height between the ends, the height of the first support member being adjustable, the second support member having a first end and a second end with a width between the ends, the width of the second support member being adjustable; attachment posts with at least one attachment post mounted on the first support structure and at least one attachment post mounted the second support structure; a plurality of wires with at least one wire connected to and extending between the attachment post mounted on the first support structure and the attachment post mounted the second support structure; and at least one resilient member connected to the wires;
   b. adjusting the width of the second support member of the first support structure by moving the second end of the second support member outward in a direction opposite the first end of the second support member;
   c. adjusting the width of the second end of the second support member of the second support structure by moving the second end of the second support member outward in a direction opposite the first end of the second support member;
   d. mounting the first support structure adjacent the docking position;
   e. mounting the second support structure adjacent the docking position spaced apart from the first support structure;
   f. adjusting the height of the first and second support members of the first and second support structures so that a plane formed by the plurality of wires is spaced apart from the docking position at least a distance greater than a height of the marine vessel;
   g. moving the marine vessel into the docking position;
   h. unloading the marine vessel; and
   i. adjusting the height of the first and second support members so that the distance between the plane formed by the plurality of wires and the docking position is reduced.

41. The method of claim 40 wherein a width of the docking position is essentially equal to a width of the marine vessel between sides of the marine vessel, wherein further in step b), adjusting the width of the second support member of the first support structure so that the width of the second support member of the first support structure is essentially equal to the width of the marine vessel and wherein further in step c), adjusting the width of the second support member of the second support structure so that the width of the second support member of the second support structure is essentially equal to the width of the marine vessel.

42. The method of claim 40 wherein a length of the docking position is essentially equal to a length of the marine vessel between a bow of the marine vessel and the stern of the marine vessel, and wherein further in step e), mounting the second support structure spaced apart from the first support structure a distance essentially equal to the length of the marine vessel.

43. The method of claim 40 wherein a width of the docking position is essentially equal to a width of the marine vessel between sides of the marine vessel of the marine vessel and wherein further in step b), adjusting the width of the first and second support members of the first and second support structures so that a width of a plane formed by the wires is greater than the width of the docking position.

* * * * *